United States Patent [19]

Manohar

[11] Patent Number: 4,888,109
[45] Date of Patent: Dec. 19, 1989

[54] HEMOFILTER FOR USE IN A CONTINUOUS ARTERIO-VENOUS HEMOFILTRATION

[76] Inventor: Namala L. Manohar, 439-1 Willow Rd. East, Staten Island, N.Y. 10314

[21] Appl. No.: 272,708

[22] Filed: Nov. 17, 1988

[51] Int. Cl.$^4$ .............................................. B01D 13/01
[52] U.S. Cl. ...................................... 210/94; 210/209; 210/321.62; 210/321.8; 210/321.89; 210/433.1; 210/446
[58] Field of Search ...................... 210/94, 198.1, 209, 210/321.62, 321.72, 321.79, 321.8, 321.88, 321.89, 433.1, 446; 604/4, 5, 6; 435/2, 311

[56] References Cited

U.S. PATENT DOCUMENTS

| | | | |
|---|---|---|---|
| 2,972,349 | 2/1961 | De Wall | 210/321.8 |
| 3,976,576 | 8/1976 | Jacobsen et al. | 210/321.8 |
| 4,148,732 | 4/1979 | Burrow et al. | 210/446 |
| 4,323,453 | 4/1982 | Zampini | 210/321.88 |
| 4,389,363 | 6/1983 | Molthop | 210/321.8 |
| 4,425,234 | 1/1984 | Reitz | 210/321.8 |
| 4,521,564 | 6/1985 | Solomon et al. | 525/54.1 |
| 4,758,337 | 7/1988 | Kohn et al. | 210/94 |

FOREIGN PATENT DOCUMENTS

| | | | |
|---|---|---|---|
| 2047874 | 12/1980 | United Kingdom | 210/321.79 |
| 2061761 | 5/1981 | United Kingdom | 210/321.8 |

*Primary Examiner*—W. Gary Jones
*Attorney, Agent, or Firm*—Edwin D. Schindler

[57] ABSTRACT

A hemofilter is disclosed for use in a continuous arterio-venous hemofiltration ("C.A.V.H") having a bundle of hollow fibers in which the lengths of the particular fibers of the bundle are greatest for those hollow fibers closest to the blood ports of the hemofilter and, preferably, would continuously decrease in length and be least for those particular fibers furthest from the blood ports. The fibers would, preferably, be secured in a bundle to one another by means of an epoxy resin, or similar substance, which did not interfere with the passage of blood through the hollow fibers of the system. Heparin may be chemically bound to the hollow fibers of the invention.

14 Claims, 1 Drawing Sheet

HEMOFILTER FOR USE IN A CONTINUOUS ARTERIO-VENOUS HEMOFILTRATION

BACKGROUND OF THE INVENTION

1. Technical Field of Invention

The present invention relates generally to an improved hemofilter for use in hemodialysis.

More particularly, the present invention relates to an improved hemofilter for use in continuous arterio-venous hemofiltration ("C.A.V.H.") having a substantially hexagonal configuration which, among other benefits, minimizes the pressure drop of the blood passing through the hollow fiber bundles of the filter to thereby reduce the likelihood of clotting within the hollow fibers of the hemofilter and, in turn, reduce the patient's need for the drug heparin during dialysis treatment.

2. Description of the Prior Art

Heretofore, hemofilters known to the prior art have generally been cylindrical in shape and having of bundles of hollow fibers for filtration. More specifically, the hemofilters currently used in C.A.V.H. were first designed for use on a dialysis machine in combination with a blood pump. Such filters, being cylindrical in geometry, have lengths in the range of approximately 10–22 cm, with relatively narrow widths in the range of 3.8–4.5 cm. Hemofilters of the prior art contain approximately 5,000 to 10,000 hollow fibers in a bundle.

The cylindrical geometry of the prior art has, however, been found to be ill-suited for a pumpless system such as C.A.V.H. The reasons for this include the fact that a long and narrow blood path through the narrow fibers leads to a drop in the perfusion pressure, which has been found to be directly proportional to the length of the fibers and inversely proportional to the fourth power of diameter of the blood path. A pressure drop in the filter leads to a drop in the blood flow rate, stagnation of red blood cells and platlets and leads to clot formation. This can be partly overcome by using higher does of heparin. However, high does of heparin can lead to bleeding on the part of the patient.

It is further known in nephrology that a cooling of fluid through a hemofilter leads to an increase in fluid viscosity, which in turn leads to an increase in flow drag and loss of kinetic energy by conversion to heat. See, Keller, K. H., *Fluid Mechanics and Mass Transfer in Artificial Organs*, Special Publication by Trasc. Amer. Soc. Art. Int. Organs, Georgetown University Press April 1973).

The foregoing considerations are taken into account and described by the so-called Reynold's Number ("Re")

$$Re = \frac{puD}{\mu}$$

wherein,
p=pressure within the tube;
u=flow volume through the tube;
D=inner diameter of the tube; and,
$\mu$=viscosity of the fluid within the tube.

The Reynold's Number should be maintained as high as practical in order to attain maximum efficiency of the hemofilter system.

While it should be theoretically possible to further increase the efficiency of C.A.V.H. systems by use of a streamline hemofilter that is shorter in length and having an increased number of hollow fibers, and thereby increase the Reynold's Number of the hemofilter system, in practice, it has been found that blood entering the hemofilter passes more quickly and efficiently through the hollow fibers closest to the inlet port and less efficiently through those hollow fibers which are a greater distance from the blood ports of the device. In other words, the greater the distance that a particular hollow fiber is from the blood ports of the hemofilter, the less efficient and effective is the filtering process of the system with respect to such fibers; blood having a tendency of seeking the more centrally located fibers of the system.

There is a tendency of the blood to less readily pass through fibers which are located away from the blood ports of the hemofilter, which results in clot formation and thereby obstructs the flow of blood through those fibers and reduces the efficiency of the filter. As may be noted from the Reynold's Number formula, an increase in the inner diameter of the tube ("D"), i.e., total number of hollow fiber parts available for blood flow, would beneficially increase the Reynold's number and increase the efficiency of the hemofilter system. The current hemofilters of cylindrical design, when used in a horizontal position, have red cell and platelet sedimentation in their dependent parts due to gravity, and this places severe limitations upon the extent to which presently known hemofilters may have the inner diameters, and thereby their efficiencies, increased.

SUMMARY OF THE INVENTION

It is, therefore, an object of the present invention to provide a hemofilter wherein the inner diameter of the filter may be increased as a means for increases the efficiency of the filter.

It is a related object of the present invention to provide a hemofilter which significantly reduces or eliminates the sedimentation effect known to occur in conventional hemofilters by a reduction of the tendency of blood passing through the hollow fibers of the filter to be concentrated within fibers located near the blood ports of the system.

It is a further object of the present invention to provide a hemofilter which is relatively short in length and may be provided with a substantially greater number of hollow fibers.

It is an additional object of the present invention to provide an improved hemofilter which is both economical to manufacture and utilize.

It is an additional object of the invention to provide a hemofilter which overcomes the disadvantages of the prior art.

The foregoing and related objects are achieved by a hemofilter having a bundle of hollow fibers in which the lengths of the particular fibers of the bundle are greatest for those hollow fibers closest to the blood ports of the hemofilter and, preferably, would continuously decrease in length and be least for those particular fibers farthest from the blood ports. The fibers would, preferably, be secured in a bundle to one another by means of an epoxy resin, preferentially at each end of the bundle, or similar substance, which did not interfere with the passage of blood through the hollow fibers of the system. As will be further explained hereinafter, with reference to be made to the drawing figures, in a vertical cross-section of the filter, the bundle of hollow fibers would essentially have the shape of a hexagon, while in horizontal cross-section, the hemofilter of the present invention would be, preferably, circular in shape. The filter of the invention is, preferably, to be employed for use in a vertical fashion, i.e., one or more blood ports of the hemofilter are to be vertically positioned, and the bundle of fibers is preferably contained in a durable casing, preferably, a hard transparent plastic.

The hemofilter of the present invention overcomes the disadvantages of the prior art by permitting a greater inner diameter and more hollow fibers, as well as avoiding the effects of sedimentation, by effectively channelling some of the blood passing through the filter to the outer-positioned fibers, i.e., those located away from the blood ports, because such fibers are both shorter and commence at a point which is lower in height (when the hemofilter of the invention is employed in a vertical fashion) than longer, more centrally-located fibers. In essence, the tendency of blood to pass through the centrally-located fibers, and tendency to avoid outer-positioned fibers, are counter-balanced against one another. By having a continuous flow of blood through all hollow fibers in the bundle of fibers comprising the hemofilter of the present invention, the opportunity for clotting, or other obstruction, is significantly reduced, if not prevented.

It should further be noted that numerous other geometrical shapes for the hemofilter of the present invention are possible, wherein hollow fibers being centrally located are longer and commence at a higher point than outer-positioned fibers. All such additional shapes, which employ the foregoing concept are, of course, encompassed in the present invention.

In addition, the hemofilter need not necessarily be utilized in a vertical fashion. Appropriate modifications regarding the positioning of the inventive hemofilter are also possible. For instance, a multi-channelled blood port, wherein the central channels are narrowed and peripheral channels are wider, will facilitate even distribution of blood flow to all fibers.

The present invention will now be further described with reference being made to the accompanying drawing figures. It should, of course, be realized that the accompanying drawing figures illustrate only a preferred embodiment of the present invention and are not intended as a definition of the limits and scope thereof.

BRIEF DESCRIPTION OF THE DRAWING

In the drawing, wherein similar reference numerals denote similar features throughout the several views.

DETAILED DESCRIPTION OF THE DRAWING AND PREFERRED EMBODIMENT

Figure 1:
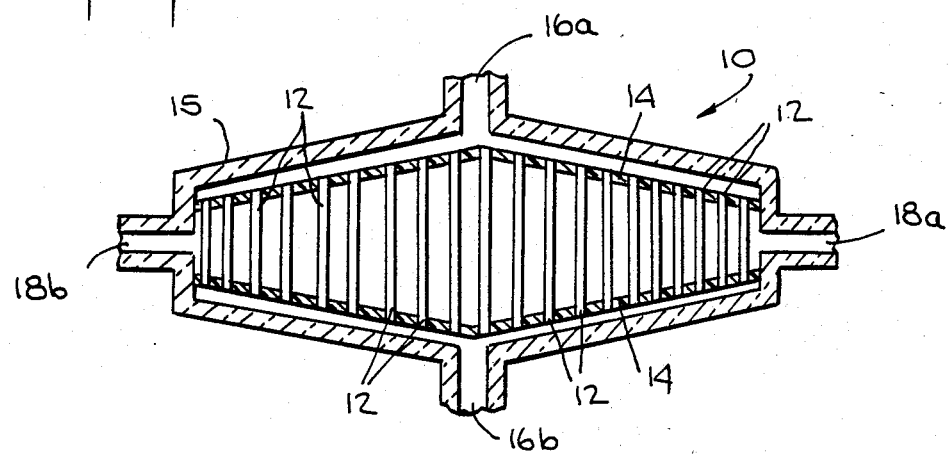
FIG. 1 shows a vertical cross-sectional view of the hemofilter of the present invention; and, FIG. 2 shows a plan, cross-sectional view of the hemofilter of FIG. 1.
Figure 2:
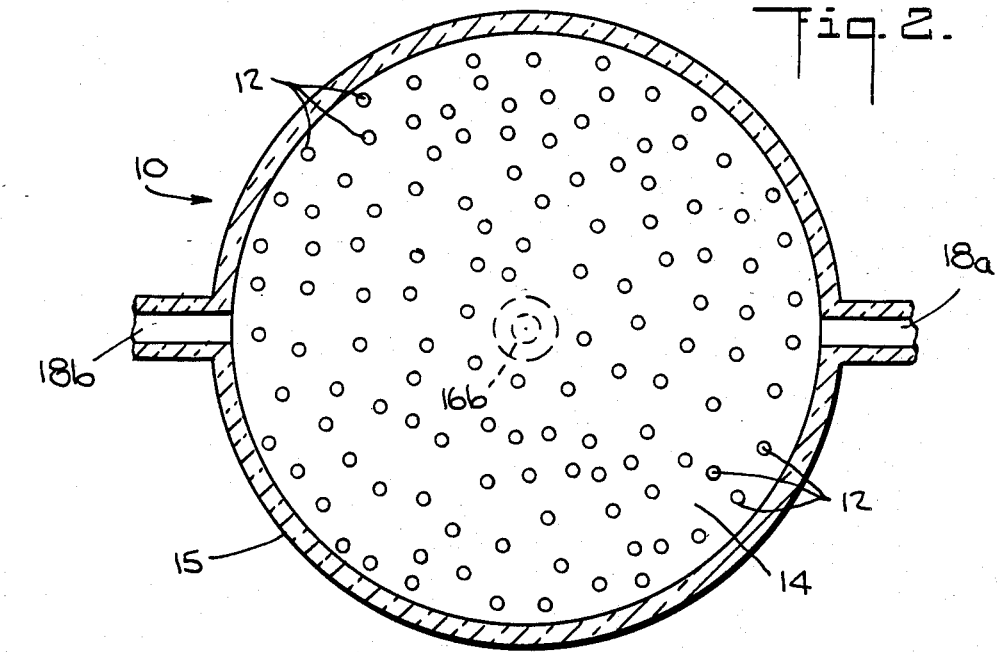

Turning now, in detail, to a consideration of the drawing figures, FIG. 1 shows a vertical cross-section of hemofilter 10 of the present invention, having hollow fibers 12 in a bundle. Hollow fibers 12 are held in a bundle, preferably be means of epoxy resin headers 14 (which is not to interfere with the passage of blood through the filter). The bundle of hollow fibers 12, in turn, is preferably contained in, for example, a hard, transparent plastic casing 15. Casing 15, includes at least two blood ports, though more may be used. In FIGS. 1 and 2, two blood ports 16a, 16b, which are preferably positioned in a vertical fashion, are shown, In addition, casing 15 may also include filtrate, or dialyzate ports. FIGS. 1 and 2 show two horizontally-positioned filtrate or dialyzate ports 18a, 18b, which are preferred, though not essential.

In a preferred embodiment of the invention, the width, or inner diameter, of hollow fibers 12, within casing 15, is preferably increased to approximately five times that of the length. This would lead to the use of a greatly increased number of hollow fibers in the bundle (approximately from 10,000 to 1,000,000.) In hemofilter 10 of the invention, which is preferably intended to be used in a vertical position, blood would enter from a top blood port (16a) and exit from a bottom blood port (16b), the blood flow being aided by gravity.

As discussed above, in hemofilters of the prior art, blood would tend to find it easier to travel at the center of the bundle, i.e., through centrally located hollow fibers close to blood ports 16a, 16b. To prevent this tendency, which causes a sedimentation effect, the hollow fiber bundle length at the center of the bundle is, preferably, maintained at a dimension greater than, for example, 1.75 inches (4.45 cm). The hollow fibers located at the periphery of the bundle should have the relatively short length (for example, 0.75 inches, or 1.9 cm).

This geometry facilitates even distribution of the blood flow through the bundle, both at its center and periphery. The bundle shape in vertical cross-section can be roughly described as a hexagon, though need not be completely symmetrical.

The transparent plastic casing 15, which encloses the bundle 12, also has a substantially hexagonal shape in cross-section (see, FIG. 1) and is circular in a plan view (see, FIG. 2.)

When hemofilter 10 of the present invention is used in a vertical position, with the blood entering at the top and exiting at the bottom, stagnation of blood is minimal and clotting is prevented. This leads to the added advantage that a decreased dosage of heparin would likely be required (estimated to be an approximately 60–80% reduction in heparin dosage as compared to the hemofilters of the prior art.)

As mentioned above two filtrate or dialyzate ports (18a, 18b) may be provided at opposite ends (i.e., opposite sides) of hemofilter 10 to facilitate the entering and exiting of dialysis fluid or hemofiltrate.

In a further preferred embodiment of the hemofilter of the present invention, it is also desirable to provide a chemical binding of heparin to the inside of the hollow fibers of the invention, as well as to the inside of the plastic casing and epoxy resin headers, which hold the fibers. The chemically binding of heparin, in such a manner, would facilitate the more efficient movement of blood through the hemofilter of the invention and further reduce the heparin dosage requirement for the patient, or altogether avoid heparin use.

Additionally because of the relatively small size of the hemofilter of the invention, as compared to prior art devices, it is possible to utilize the hemofilter of the invention in an ambulatory setting where the filter is on the person of the patient. Because of the increased efficiency and decreased clotting resulting from the present invention, the hemofilter of the invention may not require changing for weeks, or even months.

It will be apparent to those of ordinary skill in the art that numerous modifications and variations may be made to the hemofilter of the present invention. For example, the dimensions of the hollow fiber bundle may, of course, be varied, i.e., pediatric, adolescent or adult; the number of fibers in the bundle may be varied; the number of blood ports and whether or not the hemofilter is to include one or more filtrate or dialyzate ports is also dependent upon the desires and needs of the user. In addition, materials other than an epoxy resin may be used to bind the bundle of fibers to one another.

Additionally, while a transparent plastic casing for use in the hemofilter of the invention is preferred, virtually any type of inert casing, whether or not transparent, and irrespective of whether the same is made of plastic, may be employed.

Finally, by selecting different chemical compositions of the hollow fiber material, one can construct a hemodialyzer, plasma-filter or a charcoal filter embodying the same design principle, i.e., a similar hexagonal shape in vertical cross-section wherein the width of the fiber bundle is greater than the length. Such further chemical compositions of the hollow fiber material are generally known to those skilled in the art and include, for example, cuprammonium, cellulose acetate, or modifications thereof. The pore size within the hollow fiber wall is different than in a hemofilter, for example, the pore size in the case of a plasma-filter is 0.2–2 microns, whereas in the hemodialyzer the pore size is much smaller than in a hemofilter.

While only several embodiments of the present invention have been shown or described, it will be obvious to those of ordinary skill in the art that many modifications may be made to the present invention without departing from the spirit and scope thereof.

What is claimed is:

1. A hemofilter for use in a continuous arterio-venous hemofiltration, comprising:
   a plurality of hollow fibers of various lengths;
   a casing for said plurality of hollow fibers, said casing including a plurality of blood ports; and,
   means for securing said plurality of hollow fibers into a bundle, said bundle being located within said casing, said plurality of hollow fibers being grouped in said bundle so that the lengths of said hollow fibers of said bundle would be greatest for those hollow fibers which were located within said bundle nearest to said blood ports and least for said hollow fibers which were located farthest from said blood ports.

2. The hemofilter according to claim 1, wherein said plurality of hollow fibers are grouped in said bundle so that the lengths of said hollow fibers of said bundle would be greatest for those hollow fibers centrally located within said bundle and least for said hollow fibers farthest from a central location of said bundle.

3. The hemofilter according to claim 2, wherein the various lengths of said plurality of hollow fibers within said bundle form a continuum of lengths from said centrally located hollow fibers of said bundle to said hollow fibers located farthest from the central location of said bundle.

4. The hemofilter according to claim 2, wherein said hollow fibers centrally located in said bundle have a fiber length of approximately 4.5 cm.

5. The hemofilter according to claim 2, wherein said hollow fibers located furthest from the central location of said bundle of said plurality of hollow fibers have a fiber length of approximately 1.9 cm.

6. The hemofilter according to claim 1, wherein said casing is made of a transparent plastic.

7. The hemofilter according to claim 1, further comprising at least one filtrate port as part of said casing.

8. The hemofilter according to claim 7, wherein said casing includes two of said filtrate ports positioned horizontally and opposite one another on a vertical side of said casing.

9. The hemofilter according to claim 1, wherein said means for securing said plurality of hollow fibers in said bundle includes epoxy resin headers at each end of said bundle.

10. The hemofilter according to claim 1, wherein said bundle of hollow fibers has a substantially hexagonal shape in vertical cross-sectional and a substantially circular shape in horizontal cross-section.

11. The hemofilter according to claim 1, wherein said hollow fibers of said bundle have heparin chemically bound thereto.

12. The hemofilter according to claim 1, wherein said bundle of said hollow fibers has a diameter of approximately 12.7 cm.

13. The hemofilter according to claim 1, wherein total width of said bundle of said plurality of hollow fibers is greater than the length of said bundle of said plurality of hollow fibers.

14. The hemofilter according to claim 1, wherein said plurality of blood ports of said casing includes two blood ports vertically positioned on top and bottom of said casing.

* * * * *